US011074736B2

(12) United States Patent
Fidaleo

(10) Patent No.: US 11,074,736 B2
(45) Date of Patent: *Jul. 27, 2021

(54) COSMETIC TRANSFORMATION THROUGH IMAGE SYNTHESIS

(71) Applicant: Disney Enterprises, Inc., Burbank, CA (US)

(72) Inventor: Douglas A. Fidaleo, Canyon Country, CA (US)

(73) Assignee: Disney Enterprises, Inc., Burbank, CA (US)

(*) Notice: Subject to any disclaimer, the term of this patent is extended or adjusted under 35 U.S.C. 154(b) by 84 days.

This patent is subject to a terminal disclaimer.

(21) Appl. No.: 16/660,193

(22) Filed: Oct. 22, 2019

(65) Prior Publication Data

US 2020/0051301 A1 Feb. 13, 2020

Related U.S. Application Data

(63) Continuation of application No. 15/801,255, filed on Nov. 1, 2017, now Pat. No. 10,489,952.

(51) Int. Cl.
*G06T 11/60* (2006.01)
*H04N 9/31* (2006.01)

(52) U.S. Cl.
CPC ........... *G06T 11/60* (2013.01); *H04N 9/3185* (2013.01); *G06T 2207/30201* (2013.01)

(58) Field of Classification Search
CPC ............ G06T 11/60; G06T 2207/30201
See application file for complete search history.

(56) References Cited

U.S. PATENT DOCUMENTS

| 6,188,777 | B1* | 2/2001 | Darrell | G06K 9/00362 |
| | | | | 348/169 |
| 2003/0231188 | A1* | 12/2003 | Cohen | G06F 8/63 |
| | | | | 345/629 |
| 2005/0105779 | A1* | 5/2005 | Kamei | G06K 9/00281 |
| | | | | 382/118 |
| 2009/0042654 | A1* | 2/2009 | Barber | A63F 13/655 |
| | | | | 463/42 |
| 2010/0215289 | A1* | 8/2010 | Pradeep | G06T 3/0093 |
| | | | | 382/293 |
| 2011/0285748 | A1* | 11/2011 | Slatter | G06T 11/60 |
| | | | | 345/629 |

(Continued)

*Primary Examiner* — Ming Y Hon
(74) *Attorney, Agent, or Firm* — Farjami & Farjami LLP

(57) ABSTRACT

According to one implementation, a system for performing cosmetic transformation through image synthesis includes a computing platform having a hardware processor and a system memory storing an image synthesis software code. The hardware processor executes the image synthesis software code to receive a user image depicting a user of the system, to receive a reference image for transforming to resemble the user image, the reference image projecting an identifiable persona, and to generate a user image metadata describing the user image, based on the user image. The hardware processor further executes the image synthesis software code to identify a reference image metadata describing the reference image, and to transform the reference image to resemble the user image, based on the user image metadata and the reference image metadata, while preserving the identifiable persona projected by the reference image.

20 Claims, 4 Drawing Sheets

(56) References Cited

U.S. PATENT DOCUMENTS

| | | | |
|---|---|---|---|
| 2013/0188880 A1* | 7/2013 | Baba | G06T 11/60 |
| | | | 382/224 |
| 2013/0198210 A1* | 8/2013 | Lee | G06F 16/583 |
| | | | 707/755 |
| 2014/0267413 A1* | 9/2014 | Du | G06K 9/00281 |
| | | | 345/633 |
| 2015/0036883 A1* | 2/2015 | Deri | G06K 9/00369 |
| | | | 382/103 |
| 2015/0123967 A1* | 5/2015 | Quinn | G06T 7/75 |
| | | | 345/420 |
| 2015/0294136 A1* | 10/2015 | Musial | G06K 9/00281 |
| | | | 382/118 |
| 2016/0196286 A1* | 7/2016 | Kim | G06F 16/583 |
| | | | 707/741 |
| 2017/0053186 A1* | 2/2017 | Allen | G06K 9/00302 |
| 2017/0287060 A1* | 10/2017 | Choi | G06T 13/40 |

* cited by examiner

COSMETIC TRANSFORMATION THROUGH IMAGE SYNTHESIS

The present application is a Continuation of U.S. application Ser. No. 15/801,255, filed Nov. 1, 2017, which is hereby incorporated by reference in its entirety into the present application.

BACKGROUND

In psychology, mirroring refers to human interaction in which one person imitates the gestures, vocal tone, or attitude of another. Mirroring typically occurs subconsciously and can result in the establishment or deepening of rapport between the person performing the mirroring and the person being mirrored. That is to say, mirroring can create an environment in which a person tends to find another person more interesting and to experience their company as more enjoyable than might be the case in the absence of mirroring behavior.

Due to its basis in human-to-human interaction, psychological mirroring does not spontaneously occur in interactions between people and virtual or dramatic characters, or between people and physical objects. As a result, the increasing diversity in appearance, physiognomy, decoration, and dress reflected by many virtual characters encountered in theme park attractions, games, and movies, for example, as well as the increasing cultural diversity of the general public, may make it difficult for some members of the public to identify with and enjoy those virtual characters.

SUMMARY

There are provided systems and methods for performing cosmetic transformation through image synthesis, substantially as shown in and/or described in connection with at least one of the figures, and as set forth more completely in the claims.

DETAILED DESCRIPTION

Figure 1:
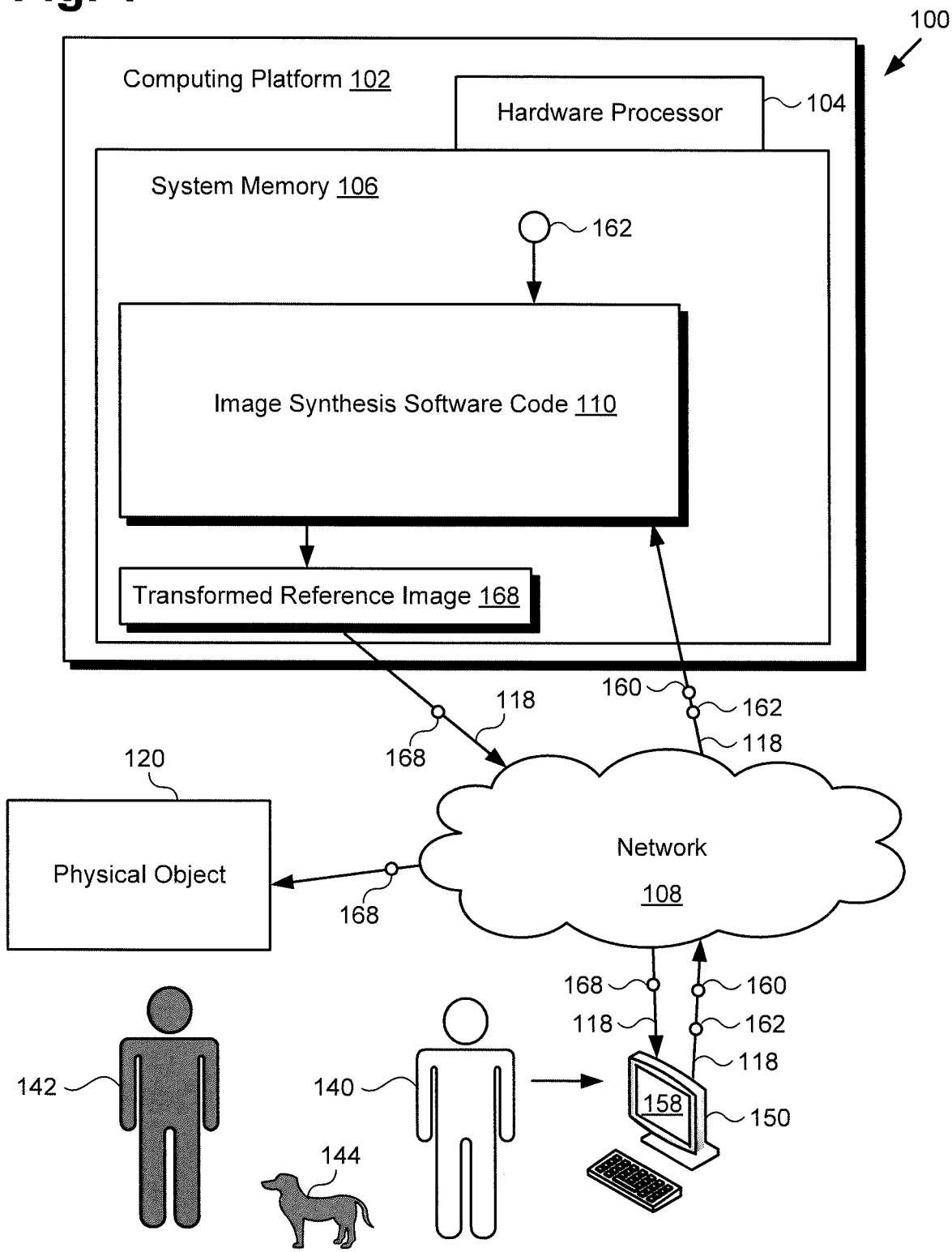
FIG. 1 shows a diagram of an exemplary system for performing cosmetic transformation through image synthesis, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

In the field of psychology, mirroring refers to human interaction in which one person imitates the gestures, vocal tone, or attitude of another. Mirroring is typically performed subconsciously, and can result in the establishment or deepening of rapport between the person performing the mirroring and the person being mirrored. That is to say, mirroring can create an environment in which a person tends to find another person more interesting and to experience their company as more enjoyable than might be the case in the absence of mirroring behavior.

Due to its basis in human-to-human interaction, psychological mirroring does not spontaneously occur in interactions between people and virtual or dramatic characters, or between people and physical objects. As a result, the increasing diversity in appearance, physiognomy, decoration, and dress reflected by many virtual characters encountered in theme park attractions, games, and movies, for example, as well as the increasing cultural diversity of the general public, may create barriers to affinity for some members of the public that limit enjoyment of those virtual characters.

The present application discloses systems and methods for performing cosmetic transformation through image synthesis that overcomes the drawbacks and deficiencies in the conventional art. By transforming a reference image of a reference subject to subtly resemble features of a user while retaining its own recognizable identity, the present solution can increase the user's affinity with the reference subject. Such a reference subject may be a dramatic or virtual character, a person, an animal, or a physical object, for example. Consequently, in use cases in which the reference subject is non-human, the present systems and methods can advantageously enable an analogue to psychological mirroring between the user and a character, animal, or object.

FIG. 1 shows a diagram of an exemplary system for performing cosmetic transformation through image synthesis, according to one implementation. As shown in FIG. 1, cosmetic transformation system 100 includes computing platform 102 having hardware processor 104, and system memory 106 implemented as a non-transitory storage device. According to the present exemplary implementation, system memory 106 stores image synthesis software code 110, and may further store one or both of reference image 162 and transformed reference image 168 produced using image synthesis software code 110.

As further shown in FIG. 1, cosmetic transformation system 100 is implemented within a use environment including communication network 108, user device 150 including display 158, and human user 140 (hereinafter "user 140") utilizing user device 150. In addition, FIG. 1 shows physical object 120, companion human being 142 (hereinafter "human companion 142"), and animal 144. Also shown in FIG. 1 are user image 160, and network communication links 118 interactively connecting user device 150 and cosmetic transformation system 100 via communication network 108.

It is noted that although FIG. 1 depicts image synthesis software code 110 as being stored in its entirety in memory 106, that representation is merely provided as an aid to conceptual clarity. More generally, cosmetic transformation system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within cosmetic transformation system 100. Thus, it is to be understood that various portions of image synthesis software code 110, such as one or more of the features described below by reference to FIG. 4, may be stored remotely from one another and/or may be executed using the distributed processor resources of cosmetic transformation system 100.

According to the implementation shown by FIG. 1, user 140 may utilize user device 150 to interact with cosmetic transformation system 100 over communication network 108. In one such implementation, cosmetic transformation system 100 may correspond to one or more web servers, accessible over a packet-switched network such as the Internet, for example. Alternatively, cosmetic transformation system 100 may correspond to one or more computer servers supporting a local area network (LAN), or included in another type of limited distribution network.

User device 150 may be any suitable mobile or stationary computing device or system that implements data processing capabilities sufficient to provide a user interface, support connections to network 108, and implement the functionality ascribed to user device 150 described herein. Moreover, in some implementations, user device 150 may be equipped with an image capture device (not shown), such as a high definition (HD) digital still and/or video camera, for example, for capturing user image 160. Alternatively, a separate image capture device (not shown) of any suitable resolution may be coupled to user device 150.

As another alternative, an image stored on a memory device can be coupled to user device 150 to provide a previously captured and stored image to user device 150. For instance, in various implementations, user device 150 may take the form of a digital camera equipped device such as a laptop computer or other personal computer, a tablet computer, or a smartphone, to name a few exemplary devices. Alternatively, all or part of the functionality ascribed to user device 150 can be implemented by processing resources within a camera. User 140 uses user device 150 to interact with cosmetic transformation system 100 in order to use image synthesis software code 110, executed by hardware processor 104, to produce transformed reference image 168.

User image 160 may be a digital photograph, a series of digital photographs, or a video sequence of user 140, for example, depicting user 140 and stored on user device 150 or captured through use of a camera included as a feature of user device 150. Reference image 162 projects an identifiable persona, such as the persona of an actor assuming a dramatic role, a persona corresponding to a virtual character, or a persona corresponding to a robot or other automated object, for example. In some implementations, reference image 162 may include one or more digital photographs or a video sequence of a companion of user 140, for example, such as human companion 142 or animal 144, captured through use of a camera included as a feature of user device 140. Alternatively, reference image 162 may be stored in system memory 106, and may be a previously generated image of an actor, a virtual character, or an automated object, for example.

It is noted that, in various implementations, transformed reference image 168, when produced using image synthesis software code 110, may be stored in system memory 106 and/or may be copied to non-volatile storage (not shown in FIG. 1). Alternatively or in addition, as shown in FIG. 1, in some implementations, transformed reference image 168 may be sent to user device 150 including display 158, and/or to physical object 120, for example by being transferred via network communication links 118 of communication network 108.

It is also noted that physical object 120 may be a computer controlled physical object or any network linked physical object capable of modification in response to receiving transformed reference image 168. That is to say, in some implementations, physical object 120 may be a robot, such as an animatronic robot, for example, capable of changing its facial expression, posture, vocalization, movement, apparent attitude, or other observable characteristics based on transformed reference image 168. In the case of a physical robot or other object, appearance changes can also be implemented by projection mapping imagery onto the physical object to modify skin tone, facial features such as wrinkles, jewelry, makeup, tattoos, using a still or video projector (not shown) aligned with features of physical object 120.

Figure 2:
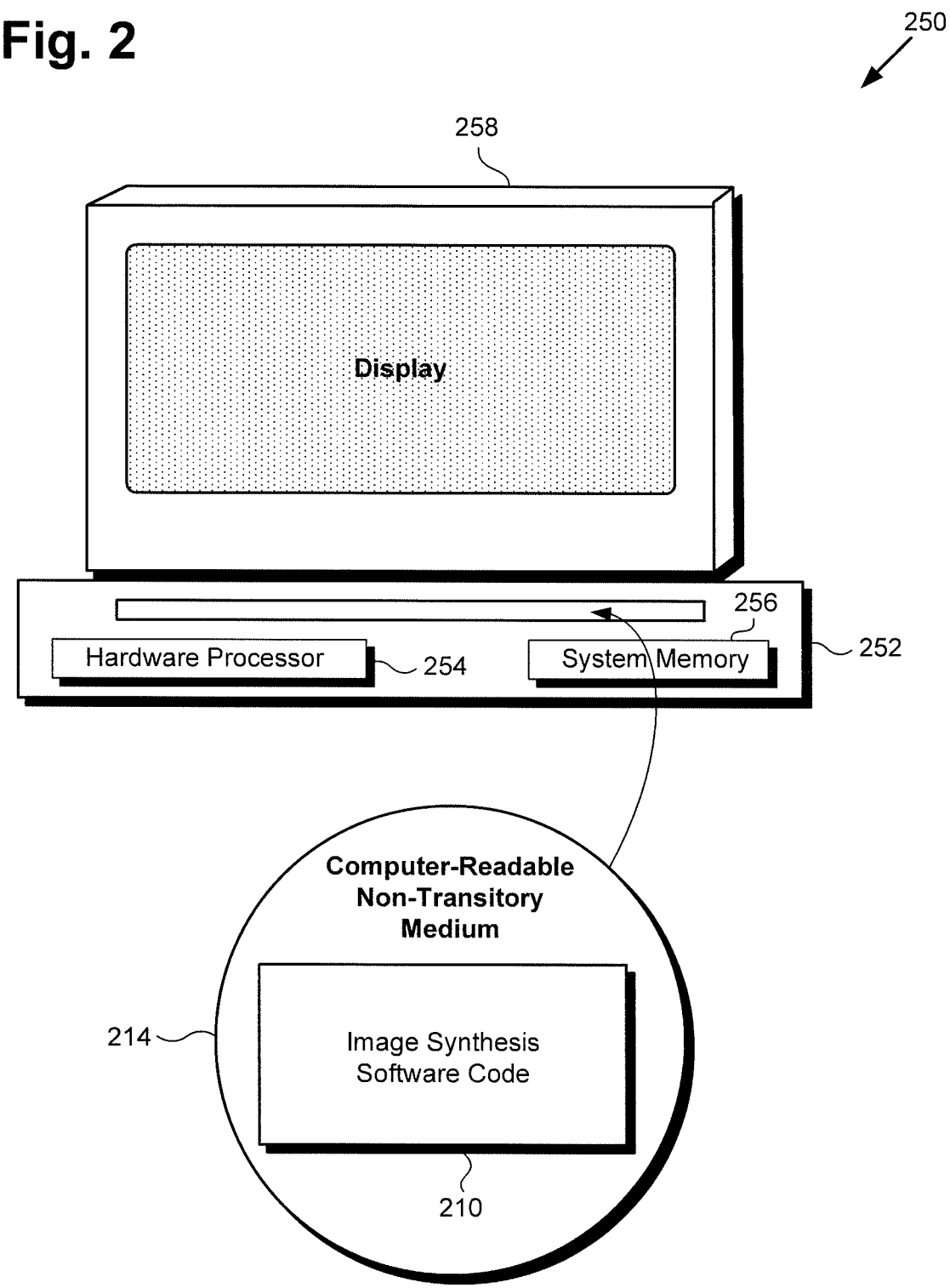
FIG. 2 shows an exemplary system and a computer-readable non-transitory medium including instructions for performing cosmetic transformation through image synthesis, according to one implementation.

FIG. 2 shows exemplary system 250 and computer-readable non-transitory medium 214 including instructions for performing cosmetic transformation through image synthesis, according to one implementation. System 250 includes computing platform 252 having hardware processor 254 and system memory 256, interactively linked to display 258. System 250 including computing platform 252 having hardware processor 254 and system memory 256 corresponds in general to cosmetic transformation system 100 including computing platform 102 having hardware processor 104 and system memory 106, in FIG. 1. Consequently, system 250 may share any of the characteristics and may perform any of the actions attributed to corresponding cosmetic transformation system 100.

Also shown in FIG. 2 is computer-readable non-transitory medium 214 having image synthesis software code 210 stored thereon. The expression "computer-readable non-transitory medium," as used in the present application, refers to any medium, excluding a carrier wave or other transitory signal, that provides instructions to hardware processor 254 of computing platform 252. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 214 provides image synthesis software code 210 for execution by hardware processor 254 of computing platform 252. Image synthesis software code 210 corresponds in general to image synthesis software code 110, in FIG. 1, and is capable of performing all of the operations attributed to that corresponding feature by the present disclosure.

Figure 3:
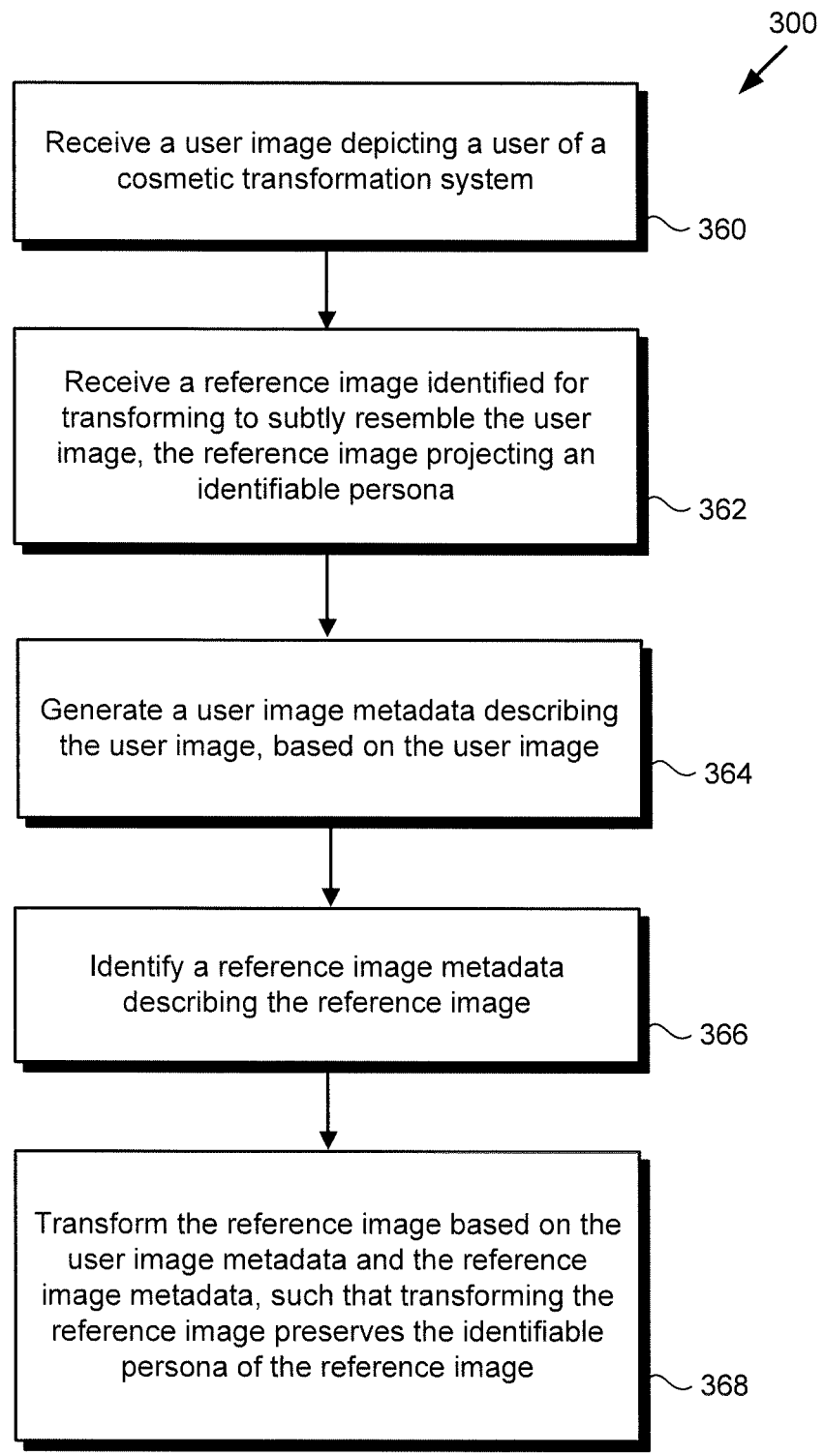
FIG. 3 shows a flowchart presenting an exemplary method for performing cosmetic transformation through image synthesis, according to one implementation; and to FIG. 4 shows an exemplary diagram of an image synthesis software code suitable for execution by a hardware processor of the systems shown by FIGS. 1 and 2, according to one implementation.

FIG. 3 shows flowchart 300 presenting an exemplary method for use by a system, such as cosmetic transformation system 100, in FIG. 1, or system 250, in FIG. 2, to perform cosmetic transformation through image synthesis. With respect to the method outlined in FIG. 3, it is noted that certain details and features have been left out of flowchart 300 in order not to obscure the discussion of the inventive features in the present application.

Figure 4:
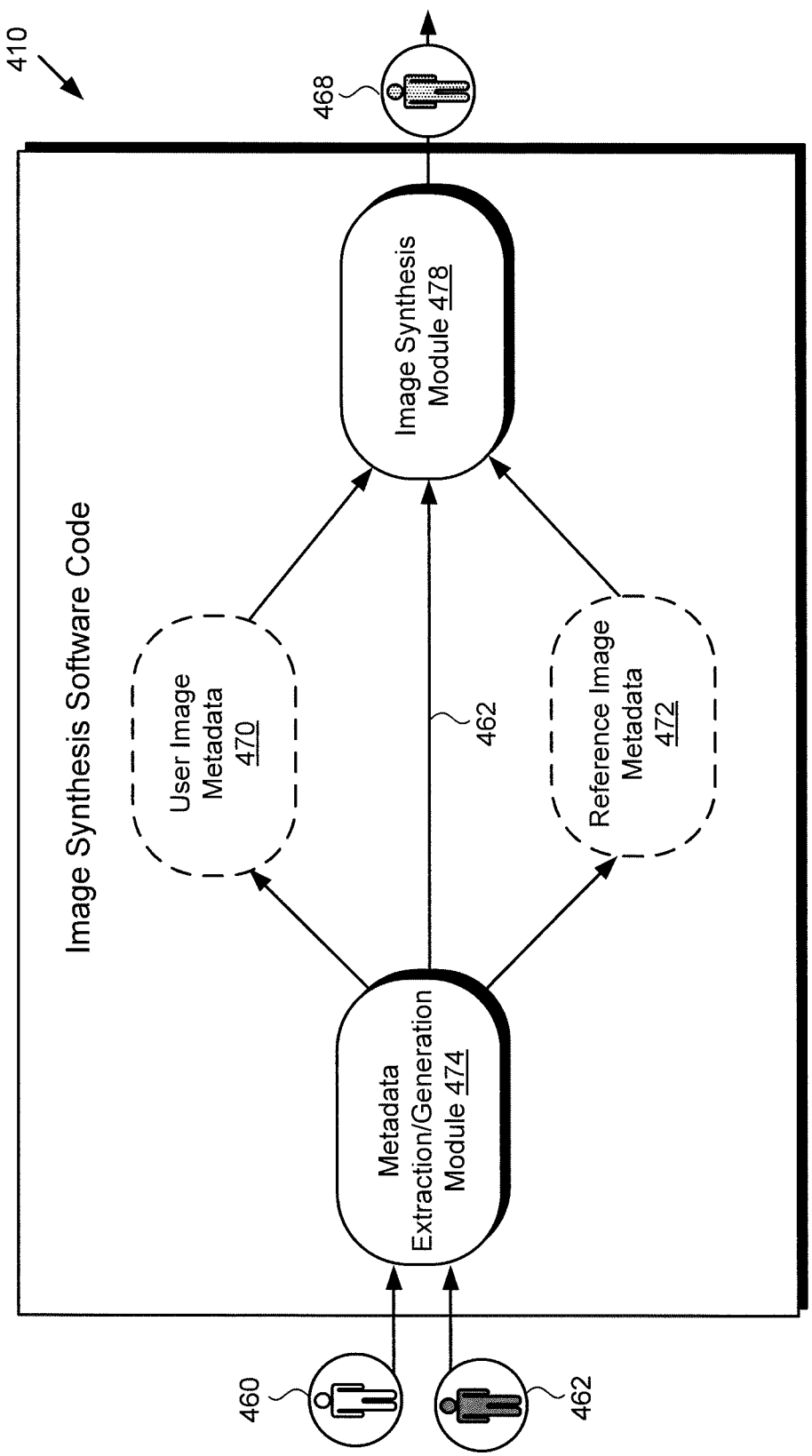

FIG. 4 shows exemplary image synthesis software code 410 suitable for execution by hardware processor 104/254 of the respective systems shown by FIGS. 1 and 2, according to one implementation. As shown in FIG. 4, image synthesis software code 410 may include metadata extraction and generation module 474 and image synthesis module 478. Also shown in FIG. 4 are user image 460, user image metadata 470, reference image 462, reference image metadata 472, and transformed reference image 468.

User image 460 and transformed reference image 468 correspond respectively in general to user image 160 and transformed reference image 168, in FIG. 1, and may share any of the characteristics attributed to those corresponding features by the present disclosure. Moreover, image synthesis software code 410 corresponds in general to image synthesis software code 110/210, in FIGS. 1 and 2, and those corresponding features may share the characteristics attributed to any corresponding feature by the present disclosure. That is to say, like image synthesis software code 410, image synthesis software code 110/210 may include modules corresponding to metadata extraction and generation module 474 and image synthesis module 478.

Referring now to FIG. 3 in combination with FIGS. 1, 2, and 4, flowchart 300 begins with receiving user image 160/460 depicting user 140 (action 360). By way of example, user 140 may utilize user device 150 to interact with cosmetic transformation system 100, or may interact directly with system 250, in order to produce transformed reference image 168/468. As shown by FIG. 1, in one implementation, user image 160/460 is received by cosmetic transformation system 100 via communication network 108 and network communication links 118. User image 160/460 is received by cosmetic transformation system 100 using image synthesis software code 110/210/410, executed by hardware processor 104/254.

As noted above, user image 160/460 may be a digital photograph, a series of digital photographs, or a video sequence of user 140, for example, depicting user 140 and stored on user device 150 or captured through use of a camera included as a feature of user device 150. For example, in some implementations, as also noted above, user device 150 may be a digital camera equipped portable computing device such as a tablet computer or a smartphone. In those implementations, user image 160/460 as a "selfie" photo, photos, or video sequence for example, user image 160/460 is transmitted to cosmetic transformation system 100 via communication network 108. Thus, in some implementations, user image 160/460 may include a facial image of user 140.

Flowchart 300 continues with receiving reference image 162/462 for transforming to subtly resemble user image 160/460, where reference image 162/462 projects an identifiable persona (action 362). Reference image 162/462 is received by image synthesis software code 110/210/410, executed by hardware processor 104/254.

As shown by FIG. 1, in one implementation, reference image 162/462 is received by cosmetic transformation system 100 via communication network 108 and network communication links 118. In those implementations, reference image 162/462 may include one or more digital photographs or a video sequence of a companion of user 140, for example, such as human companion 142 or animal 144, captured through use of a camera included as a feature of user device 140. In some implementations, reference image 162/462 may include a facial image of human companion 142 or animal 144.

Alternatively, in some implementations, reference image 162/462 may be stored in system memory 106/256, and may be selectable by user 140. In those implementations, reference image 162/462 may be identified based on a selection input provided by user 140, or by an independent operator who is utilizing user device 150. As yet another alternative, reference image 162/462 may be identified automatically by image selection processes executed within user device 150, which selects reference images 162/462 based on application-specific criteria such as apparent, gender, cultural background, appearance, dress, or other criteria deemed relevant to a particular application. In many cases reference image 162/462 will be predetermined by an application, such as an avatar representing a game character, concierge, help desk attendant or the like, and further selection is not necessary. Furthermore, in those implementations, reference image 162/462 may be received as a data transfer to image synthesis software code 110/210/410 within system memory 106/256.

It is noted that, in implementations in which reference image 162/462 is stored in system memory 106/256 and is selectable by user 140, reference image 162/462 may include an image of an actor assuming a dramatic role. For example, in such an implementation, reference image 162/462 may include one or more body images or facial images of an actor in the role of. As another example of implementations in which reference image 162/462 is stored in system memory 106/256 and is selectable by user 140, reference image 162/462 may include one or more body images or facial image of a virtual character, such as a virtual character from an animated movie.

Reference image 162/462 may include one or more still digital images or a video sequence of physical object 120. In some implementations, physical object 120 may be a robot having expressive physical features. In those implementations, reference image 162/462 may include one or more body or facial image of physical object 120.

Flowchart 300 continues with generating user image metadata 470 describing user image 160/460, based on user image 160/460 (action 364). The generation of user image metadata 470 describing user image 160/460, based on user image 160/460, may be performed by image synthesis software code 110/210/410, executed by hardware processor 104/254, and using metadata extraction and generation module 474.

For example, metadata extraction and generation module 474 may detect and analyze user image 160/460 through use of one or more of "speeded up robust features" (SURF), "scale-invariant feature transform" (SIFT), and/or other computer vision techniques. In some implementations, for example, metadata extraction and generation module 474 may be used to generate user image metadata 470 in the form of metadata describing one or more of a hair style and/or color, skin tone, clothing, accessories, and facial expression and/or facial structure included in user image 160/460.

As a specific example, user image metadata 470 describing a facial structure of a facial image included in user image 160/460 may include key geometric features of the facial image. Such key geometric features may include eye size, eye corners, contours of the eyes, mouth size, mouth corners, contours of the lips, jaw line, and/or relative distances between features such as eyes, nose, mouth, and ears, for example. Other features that may be useful in particular applications are skin tone, apparent age, hair color, facial hair style, body decorations, clothing style, jewelry, indicia of disability or injury, such as use of a wheelchair or crutches, or the presence of a cast or bandages, makeup, wrinkles, scars, dimples, eyebrow style, eye color and the like.

It is noted that, in some implementations, actions 360, 362 and 364 may be performed discontinuously with later processes. For example, user 140 may create user image metadata 470 at a convenient location such as home, work, or at a professional office or automated service specializing in generating user image metadata 470 from captured images. User image metadata 470 can be stored on a portable storage device in a format selected to be readable by user device 150 or electronically transmitted to user device 150 or directly to computing platform 120. In this manner user image metadata 470 can be reused many times to customize avatars and robots later encountered by user 140.

Flowchart 300 continues with identifying reference image metadata 472 describing reference image 162/462 (action 366). The identification of reference image metadata 472 describing reference image 162/462 may also be performed by image synthesis software code 110/210/410, executed by hardware processor 104/254, and using metadata extraction and generation module 474.

In some implementations, reference image 162/462 may include one or more digital photographic or video images of human companion 142 or animal 144 captured by user 140 and transferred to cosmetic transformation system 100 via communication network 108. In those implementations, identification of reference image metadata 472 may include generation of reference image metadata 472, based reference image 162/462.

For example, and analogous to the procedure described above by reference to user image metadata 470 in action 364, metadata extraction and generation module 474 may detect and analyze reference image 162/462 through use of one or more of SURF, SIFT, and/or other computer vision techniques. In some implementations, for example, metadata extraction and generation module 474 may be used to generate reference image metadata 472 in the form of metadata describing one or more of a hair style and/or color, skin tone, clothing, accessories, and facial expression and/or facial structure of reference image 162/462. Furthermore, and as also described above by reference to action 364, reference image metadata 472 describing a facial structure of a facial image included in reference image 162/462 may include key geometric features of the facial image, such as eye size, eye corners, contours of the eyes, mouth size, mouth corners, contours of the lips, jaw line, and relative distances between facial features.

However, reference image 162/462 may be a previously generated image stored in system memory 106/256. In those implementations, for example, reference image metadata 472 may include pre-existing reference image metadata 472 stored with reference image 162/462 or otherwise accessible to image synthesis software code 110/210/410.

Moreover, reference image metadata 472 may also include boundaries for the modification of various features of reference image 162/462 to ensure that subsequent transformation of reference image 162/462 retains the identifiable persona of reference image 162/462. In other words, image metadata 472 can include a range for the changes that are permitted to reference image 162/462 while retaining the perceived identity of the persona projected by reference image 162/462.

By way of example, permissible changes in spacing of facial features of reference image may be limited in relative terms, such as not more than five percent, or in absolute terms, such as not more the three millimeters. As another example, permissible boundaries in changes to hair color may permit a blond reference image to have darker hair, such as auburn hair, to subtly resemble a raven haired user image, but may prohibit the reference image from being darkly brunette. As yet another example, permissible boundaries in body shape or size may limit the change in body surface area (BSA) of the reference image to a specific threshold, such as ten percent, for instance, regardless of disparity in apparent body size between the reference and user images.

Reference image 162/462 is then transformed based on user image metadata 470 and reference image metadata 472 (action 368). Transformation of reference image 162/462 results in production of transformed reference image 168/468 having features that subtly resemble those of user image 160/460 while preserving the identifiable persona projected by reference image 162/462. Transformation of reference image 162/462 based on user image metadata 470 and reference image metadata 472, may be performed by image synthesis software code 110/210/410, executed by hardware processor 104/254, and using image synthesis module 478.

Depending on the number and type of images included in user image 160/460 and reference image 162/462, transformation of reference image 162/462 may be performed using conventional methods known in the art, such as performance-driven techniques, image-based animation, or through use of a three-dimension morphable model (3DMM), for example. Alternatively, in implementations in which user image 160/460 and reference image 162/462 each includes a single digital photographic image, transformation of reference image 162/462 may be performed using the Beier-Neely algorithm, or a hierarchical multiscale Markov Random Field (MRF) that incorporates multiscale local and global image features and models the depths and the relation between depths at different points in each image. An example of image warping, which may be used in one implementation, is described by Arad et al. "Image Warping by Radial Basis Functions: Application to Facial Expressions," CVGIP: Graphical Models and Image Processing, Volume 56, Issue 2, March 1994, Pages 161-172, which is hereby incorporated by reference in its entirety.

Once produced, transformed reference image 168/468 may be presented to, or may interact with user 140 in a variety of ways. For example, in some implementations, transformed reference image 168/468 may be utilized by an application, such as a chatbot, virtual reality (VR), game, or other entertainment or educational application, to communicate with or interact with user 140. Moreover, in some implementations, transformed reference image 168/468 may be transferred to user device 150 via communication network 108 for presentation to or interaction with user 140 via display 158.

Alternatively, in other implementations, transformed reference image 168/468 may be transferred to physical object 120 via communication network 108 in order to modify physical object 120 to more closely resemble user image 160/460 in some way. For example, in some implementations, physical object 120 may be an automated object, such as a robot, capable of changing its facial expression, posture, vocalization, movement, apparent attitude, or other observable characteristics based on transformed reference image 168/468.

Thus, the present application discloses systems and methods for performing cosmetic transformation through image synthesis. By subtly transforming a reference image of a reference subject to resemble features of a user while preserving its own recognizable identity, the present solution can increase the user's affinity with the reference subject, which may be a dramatic or virtual character, a person, an animal, or a physical object, for example. Consequently, in use cases in which the reference subject is non-human, the present systems and methods can advantageously enable an analogue to psychological mirroring between the user and a character, animal, or object.

Various techniques can be used for implementing the concepts described in the present application without departing from the scope of those concepts. The described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A cosmetic transformation system comprising:
   a computing platform including a hardware processor and a system memory;
   an image synthesis software code stored in the system memory;
   the hardware processor configured to execute the image synthesis software code to:
   receive a facial image;
   receive a reference facial image for transforming to resemble the facial image, the reference facial image projecting an identifiable persona;
   obtain first metadata describing first key geometric features of the facial image;
   obtain second metadata describing second key geometric features of the reference facial image; and
   transform the reference facial image to resemble the facial image, based on the first metadata describing the first key geometric features of the facial image and the second metadata describing the second key geometric features of the reference facial image;
   wherein transforming the reference facial image preserves the identifiable persona projected by the reference facial image.

2. The cosmetic transformation system of claim 1, wherein the first metadata further describes first relative distances between the first key geometric features of the facial image, and the second metadata further describes second relative distances between the second key geometric features of the reference facial image, and wherein the hardware processor is further configured to execute the image synthesis software code to:
   transform the reference facial image to resemble the user facial image, further based on the first relative distances between the first key geometric features of the user facial image and the second relative distances between the second key geometric features of the reference facial image.

3. The cosmetic transformation system of claim 1, the first metadata further describes one or more of a hair style, hair color, skin tone, clothing, accessory, facial expression or facial structure depicted in the facial image, and wherein the second metadata further describes one or more of a hair style, hair color, skin tone, clothing, accessory, facial expression or facial structure of the reference facial image.

4. The cosmetic transformation system of claim 1, wherein the reference facial image comprises a facial image of a human being.

5. The cosmetic transformation system of claim 1, wherein the reference facial image comprises a facial image of an actor assuming a dramatic role.

6. The cosmetic transformation system of claim 1, wherein the reference facial image comprises a facial image of a virtual character.

7. The cosmetic transformation system of claim 1, wherein the second metadata includes boundaries for modifying the second key geometric features of the reference facial image to ensure that transforming the reference facial image retains the identifiable persona projected by the reference facial image.

8. The cosmetic transformation system of claim 7, wherein the boundaries define a range of permitted changes to the reference facial image when transforming the reference facial image to resemble the user facial image.

9. The cosmetic transformation system of claim 7, wherein the boundaries define a range of permitted spacing between two or more of the second key geometric features of the reference facial image during the transforming, and wherein the boundaries define a range of permitted of colors for one or more of the second key geometric features of the reference facial image during the transforming.

10. The cosmetic transformation system of claim 1, wherein the first metadata is extracted from the received user facial image.

11. A method for use by a cosmetic transformation system including a computing platform having a hardware processor and a system memory storing an image synthesis software code, the method comprising:
    receiving, using the hardware processor, a facial image;
    receiving, using the hardware processor, a reference facial image for transforming to resemble the facial image, the reference facial image projecting an identifiable persona;
    obtaining, using the hardware processor, first metadata describing first key geometric features of the facial image;
    obtaining, using the hardware processor, second metadata describing second key geometric features of the reference facial image; and
    transforming, using the hardware processor, the reference facial image to resemble the facial image, based on the first metadata describing the first key geometric features of the facial image and the second metadata describing the second key geometric features of the reference facial image;
    wherein transforming the reference facial image preserves the identifiable persona projected by the reference facial image.

12. The method of claim 11, wherein the first metadata further describes first relative distances between the first key geometric features of the facial image, and the second metadata further describes second relative distances between the second key geometric features of the reference facial image, and wherein the transforming of the reference facial image to resemble the facial image is further based on the first relative distances between the first key geometric features of the facial image and the second relative distances between the second key geometric features of the reference facial image.

13. The method of claim 11, the first metadata further describes one or more of a hair style, hair color, skin tone, clothing, accessory, facial expression or facial structure depicted in the facial image, and wherein the second metadata further describes one or more of a hair style, hair color, skin tone, clothing, accessory, facial expression or facial structure of the reference facial image.

14. The method of claim 11, wherein the reference facial image comprises a facial image of a human being.

15. The method of claim 11, wherein the reference facial image comprises a facial image of an actor assuming a dramatic role.

16. The method of claim 11, wherein the reference facial image comprises a facial image of a virtual character.

17. The method of claim 11, wherein the second metadata includes boundaries for modifying the second key geometric features of the reference facial image to ensure that transforming the reference facial image retains the identifiable persona projected by the reference facial image.

18. The method of claim 17, wherein the boundaries define a range of permitted changes to the reference facial image when transforming the reference facial image to resemble the facial image.

19. The method of claim 17, wherein the boundaries define a range of permitted spacing between two or more of the second key geometric features of the reference facial image during the transforming, and wherein the boundaries define a range of permitted of colors for one or more of the second key geometric features of the reference facial image during the transforming.

20. The method of claim 11, wherein the first metadata is extracted from the received facial image.

* * * * *